United States Patent
Elgebaly et al.

(10) Patent No.: US 7,417,482 B2
(45) Date of Patent: Aug. 26, 2008

(54) ADAPTIVE VOLTAGE SCALING FOR AN ELECTRONICS DEVICE

(75) Inventors: Mohamed Elgebaly, San Jose, CA (US); Khurram Zaka Malik, Santa Clara, CA (US); Lew G. Chua-Eoan, Carlsbad, CA (US); Seong-Ook Jung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/286,087

(22) Filed: Nov. 22, 2005

(65) Prior Publication Data

US 2007/0096775 A1    May 3, 2007

Related U.S. Application Data

(60) Provisional application No. 60/732,228, filed on Oct. 31, 2005.

(51) Int. Cl.
   *H03H 11/26*    (2006.01)
(52) U.S. Cl. ........................... 327/278; 327/407
(58) Field of Classification Search ................ 327/403, 327/404, 407, 408, 409, 410, 262, 270, 271, 327/272, 276, 277, 278
   See application file for complete search history.

(56) References Cited

U.S. PATENT DOCUMENTS 7,129,763 B1 * 10/2006 Bennett et al. ............... 327/262
7,167,035 B2 *  1/2007 Cao .............................. 327/261

OTHER PUBLICATIONS

Sedra & Smith, "Microelectronic Circuits", 1991, Saunders College Publishing, pp. 930-934 & 938-939.*
Akui, et al. (2004) Dynamic voltage and frequency management for a low-power embedded microprocessor. IEEE International Solid-State Circuits Conference. Session 3, 3.5.
Burd, et al. (2000) A dynamic voltage scaled microprocessor system. IEEE Journal of Solid-State Circuits, vol. 35, No. 11, pp. 1571-1580.
Dhar, S., et al. (2002) Closed-loop adaptive voltage scaling controller for standard-cell ASICs. ISLPED '02, Aug. 12-14, Monterey, CA, USA.

(Continued)

*Primary Examiner*—Jeffrey S Zweizig
(74) *Attorney, Agent, or Firm*—Kenyon Jenckes; William Marcus Hooks; Thomas R. Rouse

(57) ABSTRACT

Techniques for adaptively scaling voltage for a processing core are described. In one scheme, the logic speed and the wire speed for the processing core are characterized, e.g., using a ring oscillator having multiple signal paths composed of different circuit components. A target clock frequency for the processing core is determined, e.g., based on computational requirements for the core. A replicated critical path is formed based on the characterized logic speed and wire speed and the target clock frequency. This replicated critical path emulates the actual critical path in the processing core and may include different types of circuit components such as logic cells with different threshold voltages, dynamic cells, bit line cells, wires, drivers with different threshold voltages and/or fan-outs, and so on. The supply voltage for the processing core and the replicated critical path is adjusted such that both achieve the desired performance.

22 Claims, 13 Drawing Sheets

OTHER PUBLICATIONS

Elgebaly, M., et al. (2004) Efficient adaptive voltage scaling system through on-chip critical path emulation. ISLPED '04, Aug. 9-11, Newport Beach, CA, USA.

Kuroda, T., et al. (1998) Variable supply-voltage scheme for low-power high-speed CMOS digital design. IEEE Journal of Solid-State Circuits, vol. 33, No. 3, pp. 454-462.

Seki, T., et al. (2005) Dynamic voltage and frequency management for a low-power embedded microprocessor. IEICE Trans. Electron., vol. E88-C, No. 4, pp. 520-527.

Wei, et al. (1999) A fully digital, energy-efficient, adaptive power-supply regulator. IEEE Journal of Solid-State Circuits, vol. 34, No. 4, pp. 520-528.

* cited by examiner

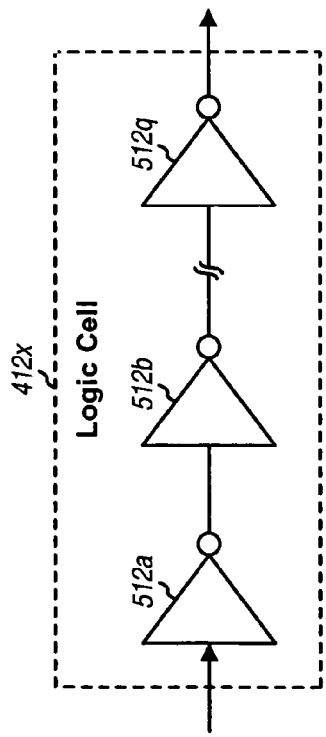
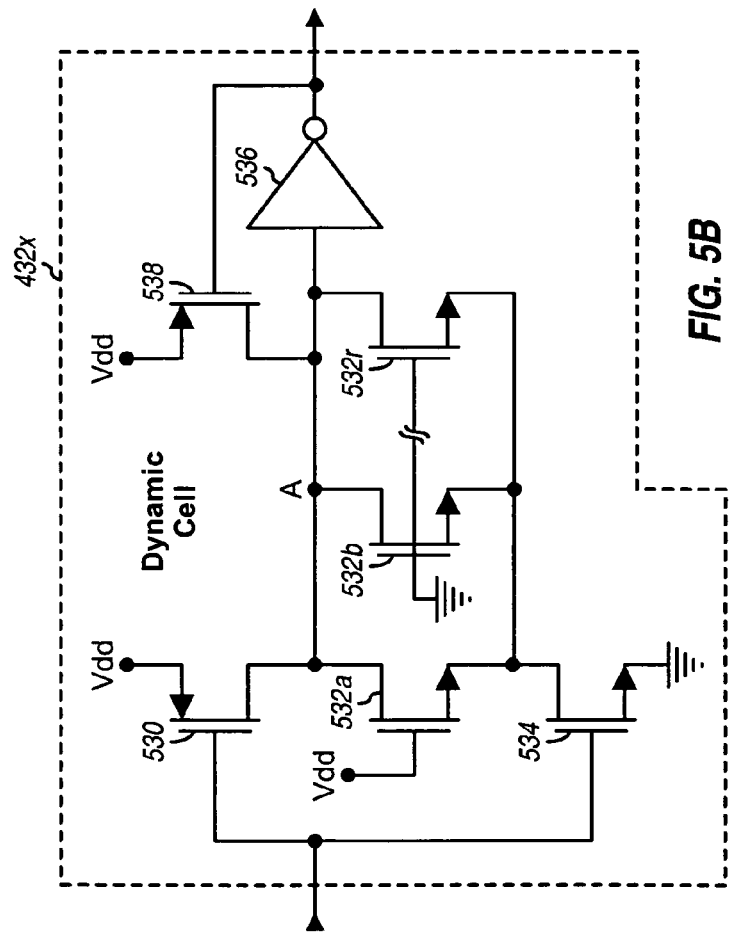
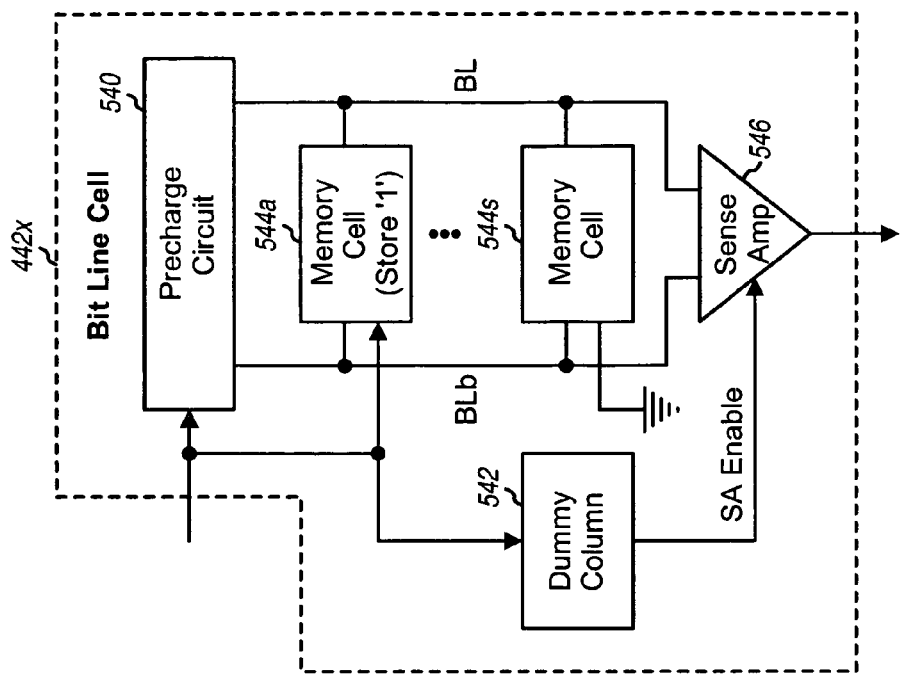
FIG. 5A
FIG. 5B
FIG. 5C

|  | Mux1 Sel | Mux2 Sel | Mux3 Sel | Mux4 Sel | Mux5 Sel | Mux6 Sel |
|---|---|---|---|---|---|---|
| Freq 1 | $a_1$ | $b_1$ | $c_1$ | $d_1$ | $e_1$ | $f_1$ |
| Freq 2 | $a_2$ | $b_2$ | $c_2$ | $d_2$ | $e_2$ | $f_2$ |
| Freq 3 | $a_3$ | $b_3$ | $c_3$ | $d_3$ | $e_3$ | $f_3$ |
| ⋮ | ⋮ | ⋮ | ⋮ | ⋮ | ⋮ | ⋮ |
| Freq V | $a_V$ | $b_V$ | $c_V$ | $d_V$ | $e_V$ | $f_V$ |

# ADAPTIVE VOLTAGE SCALING FOR AN ELECTRONICS DEVICE

RELATED APPLICATIONS

This application claims the benefit of provisional U.S. application Ser. No. 60/732,228, entitled "ADAPTIVE VOLTAGE SCALING FOR AN ELECTRONICS DEVICE," filed Oct. 31, 2005, assigned to the assignee of the present application, and incorporated herein by reference in its entirety for all purposes

BACKGROUND

1. Field

The present disclosure relates generally to circuits, and more specifically to techniques for conserving battery power for an electronics device.

2. Background

Wireless devices (e.g., cellular phones) are widely used for various applications such as wireless communication, messaging, video, gaming, and so on. The applications and functions for wireless devices are continually expanding to meet growing consumer demands. Consequently, more sophisticated wireless devices are continually being designed with higher level of integration and faster operating speed in order to support more applications and functions with small device sizes.

Highly integrated wireless devices may consume more power. This may be especially true when operating at a high clock. Higher power consumption can shorten battery life, which is highly undesirable since long battery life is an important design and marketing parameter for portable wireless devices. Hence, a great deal of design effort is often devoted to extending battery life while achieving good performance. For example, wireless devices are often designed to power down as much circuitry as possible when operating in an idle mode to conserve power. An effective method for reducing power consumption when operating in an active mode is to scale or adjust the supply voltage since power consumption is approximately a quadratic function of supply voltage. For example, reducing the supply voltage by 10 percent may save power consumption by almost 20 percent.

The goal of supply voltage scaling is to reduce the supply voltage as much as possible while maintaining the required performance. This may be achieved by identifying a critical signal path in an integrated circuit (IC), e.g., the signal path with the longest delay, and adjusting the supply voltage such that the critical signal path meets timing requirements. This criterion is difficult to establish in modern VLSI circuits for several reasons. First, the critical signal path can change as the supply voltage is varied. One signal path may be critical at one supply voltage while another signal path may be critical at another supply voltage. Second, at a given supply voltage, the critical signal path may vary from die to die based on IC process and temperature variations. Conventionally, these variations are accounted for by adding a large safety margin to ensure proper operation in all conditions. This large safety margin typically results in higher power consumption much of the time.

There is therefore a need in the art for techniques to more effectively conserve battery power for a wireless device.

SUMMARY

Techniques for adaptively scaling supply voltage for electronics devices (e.g., cellular phones) are described herein. In a specific embodiment, the logic speed and the wire speed for a processing core are characterized, e.g., using a ring oscillator. A target clock frequency for the processing core is determined, e.g., based on computational requirements for the core. A replicated critical path is formed based on the characterized logic speed and wire speed and the target clock frequency and using a set of programmable delay lines. This replicated critical path emulates the actual critical path in the processing core and may include different types of circuit components such as, e.g., logic cells with different threshold voltages, dynamic cells, bit line cells, wires, drivers with different threshold voltages and/or fan-outs, and so on, as described below. The supply voltage for the processing core and the replicated critical path is adjusted such that both achieve the desired performance.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 5A, 5B and 5C show a logic cell, a dynamic cell, and a bit line cell, respectively, within the delay synthesizer.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The adaptive voltage scaling techniques described herein may be used for various types of integrated circuits. For example, these techniques may be used for an application specific integrated circuit (ASIC), a digital signal processor (DSP), a digital signal processing device (DSPD), a programmable logic device (PLD), a field programmable gate array (FPGA), a processor, a controller, a microprocessor, and so on. These techniques may also be used for various electronics devices such as wireless communication devices, cellular phones, personal digital assistants (PDAs), portable computers, and so on. For clarity, the techniques are described below for an ASIC within a wireless device, e.g., a cellular phone.

Figure 1:
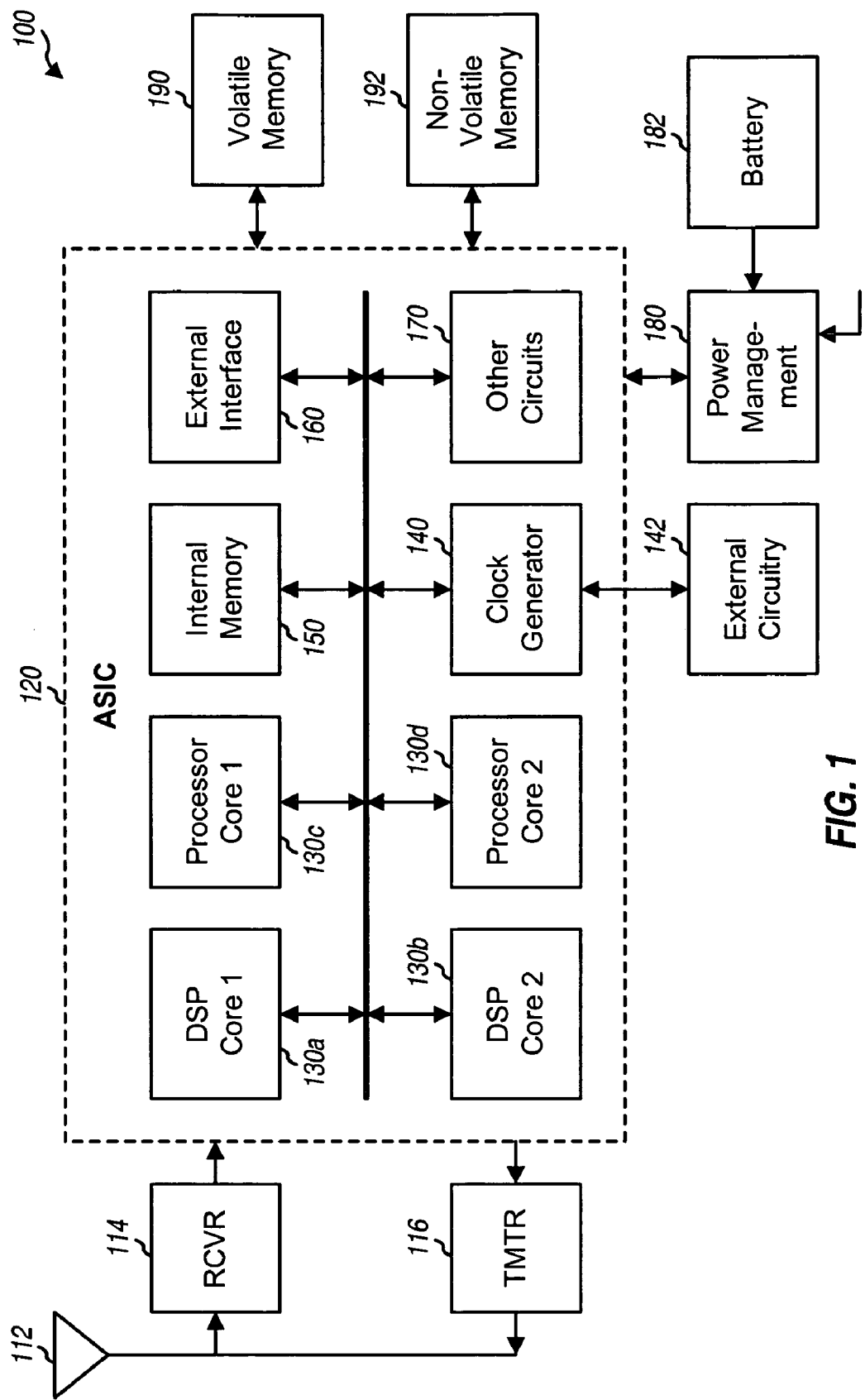
FIG. 1 shows a block diagram of a wireless device.

FIG. 1 shows a block diagram of a wireless device 100, which may be able to monitor and/or communicate with one or more wireless communication systems. On the receive path, an antenna 112 receives signals transmitted by base stations and/or satellites and provides a received signal to a receiver (RCVR) 114. Receiver 114 processes (e.g., filters, amplifies, frequency downconverts, and digitizes) the received signal and provides samples to an ASIC 120 for further processing. On the transmit path, ASIC 120 processes data to be transmitted and provides data chips to a transmitter (TMTR) 116. Transmitter 116 processes (e.g., converts to analog, filters, amplifies, and frequency upconverts) the data chips and generates a modulated signal, which is transmitted via antenna 112.

ASIC 120 includes various processing units that support monitoring and/or communication with one or more communication systems. For the embodiment shown in FIG. 1, ASIC 120 includes DSP cores 130a and 130b, processor cores 130c and 130d, a clock generator 140, an internal memory 150, an external interface unit 160, and other circuits 170. DSP cores 130a and 130b, perform processing (e.g., demodulation and decoding) for the receive path, processing (e.g., encoding and modulation) for the transmit path, and/or processing for other applications and functions. Each DSP core may include one or more multiply-and-accumulate (MAC) units, one or more arithmetic logic units (ALUs), and so on. Processor cores 130c and 130d support various functions such as video, audio, graphics, gaming, and so on.

Clock generator 140 generates clocks used by the processing units within ASIC 120 and may couple to external circuitry 142, which may include crystals, inductors, capacitors, and so on. Clock generator 140 may include one or more phase locked loops (PLLs) that control the oscillators used to generate the clocks. Internal memory 150 stores data and program codes used by the processing units within ASIC 120. External interface unit 160 interfaces with other units external to ASIC 120. Other circuits 170 may include a power control unit that controls power to various processing units within ASIC 120, PLLs for receiver 114 and transmitter 116, and/or other circuitry.

For the embodiment shown in FIG. 1, ASIC 120 further couples to a power management unit 180, a volatile memory 190, and a non-volatile memory 192. Power management unit 180 couples to a battery 182 and also receives external power via a power connector. Power management unit 180 conditions the received power supply and provides regulated supply voltages for the processing units within ASIC 120. Volatile memory 190 provides bulk storage for data and program codes used by ASIC 120. Non-volatile memory 192 provides bulk non-volatile storage.

In general, wireless device 100 may include fewer, more and/or different integrated circuits than those shown in FIG. 1. Furthermore, ASIC 120 may include fewer, more and/or different processing units than those shown in FIG. 1. In general, ASIC 120 may include any number of DSP cores and any number of processor cores. The number of processing units and the types of processing units included in ASIC 120 are typically dependent on various factors such as the communication systems, applications, and functions supported by wireless device 100.

Figure 2:
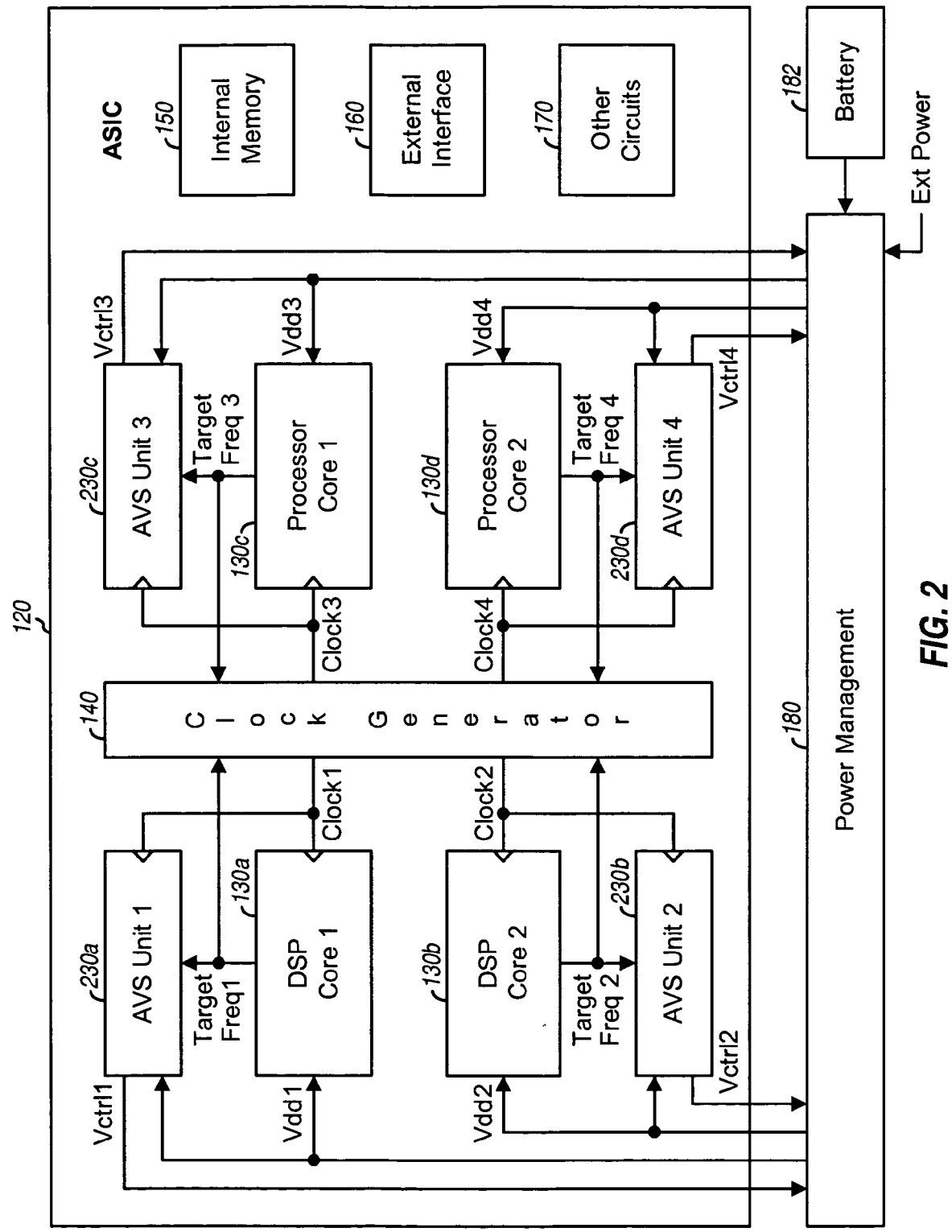
FIG. 2 shows an ASIC with adaptive voltage scaling (AVS).

FIG. 2 shows an embodiment of ASIC 120 with adaptive voltage scaling (AVS). For this embodiment, one AVS unit 230 is provided for each processing core 130 and is used to adaptively scale the supply voltage for that core. In particular, AVS units 230a and 230b perform adaptive voltage scaling for DSP cores 130a and 130b, respectively, and AVS units 230c and 230d perform adaptive voltage scaling for processor cores 130c and 130d, respectively.

Each processing core 130 receives from clock generator 140 a clock used to trigger synchronous circuits within the core. Each core 130 provides to clock generator 140 and to its AVS unit 230 a target frequency for its clock. This target frequency may be selected based on the processing load and computational requirements for the core. For each processing core 130, clock generator 140 generates the clock at the target frequency and provides this clock to the core as well as to the associated AVS unit 230. Each processing core 130 and its associated AVS unit 230 also receive a regulated supply voltage (Vdd) from power management unit 180. The supply voltage for each processing core 130 is set by the associated AVS unit 230 such that the core can operate at the target clock frequency.

For the embodiment shown in FIG. 2, the clock for each processing core 130 may be set independently by clock generator 140, and the supply voltage for each processing core 130 may be set independently by power management unit 180. In other embodiments, multiple processing cores may share a common clock and/or a common supply voltage that may be jointly set for these cores.

Adaptive voltage scaling is a closed loop system that adjusts the supply voltage to a level that satisfies performance requirements, which may be quantified by proper operation at a target frequency. In general, a higher supply voltage corresponds to less delay, which allow for operation at a higher frequency with a faster clock. The peak supply voltage can provide the shortest delay and the highest performance level. However, this highest performance level is not required some or much of the time. In such instances, the supply voltage may be reduced. Adaptive voltage scaling thus exploits the variations in computational requirements to scale the supply voltage and reduce the average power consumption while maintaining the required performance. As a result, battery life may be extended, which is highly desirable.

AVS unit 230 for each processing core 130 adjusts the supply voltage such that the core can meet its performance requirements. In an embodiment, each AVS unit simulates the actual performance of the associated core across IC process, temperature, and voltage variations. Each AVS unit emulates the critical path for the associated core, tracks the performance of this critical path, and adjusts the supply voltage to the lowest possible level that allows the critical path to achieve the target performance. The ability to closely track the actual critical path for different conditions results in a highly efficient adaptive voltage scaling.

Each AVS unit 230 tracks the performance of the critical path in the associated processing core 130. In an embodiment, this is achieved using a delay synthesizer having a blend of circuit components that closely matches the circuit blend for the critical path in the associated core. These circuit components may include logic cells, transistor devices with different threshold voltages, dynamic cells, bit line cells, wires, drivers with different threshold voltages and/or fan-outs, and so on, which are described below. These different circuit components have electrical characteristics (e.g., delays) that may vary in different manners across IC process, temperature, and voltage variations.

Logic cells may be formed with inverters and/or other logic gates. The inverters and logic gates are implemented with transistors, which may be P-channel field effect transistors (P-FETs), N-channel FETs (N-FETs), and so on. Each FET device is designed with a particular threshold voltage, which is the voltage at which the device turns on. A low threshold voltage (LVT) results in less delay through the FET device but higher leakage current, which is the current passing through the FET device when it is turned off. Conversely, a high threshold voltage (HVT) results in lower leakage current but more delay. A combination of LVT and HVT devices may be used to achieve good performance where needed and low leakage where required. The electrical characteristics of LVT and HVT devices may vary in different manners with IC process, temperature, and voltage. Computer simulation indicates that an HVT inverter with a drive capability or fan-out of four has a delay that tracks well with the delays of other HVT logic gates. However, the delay of this HVT inverter has a large deviation from the delay of an LVT inverter.

Wires are relatively long traces etched on an IC die to interconnect circuit components on the IC die. The delay of a wire is affected by the length, width and height of the wire as well as the fan-out of a driver for that wire. The length and width of a wire are typically selected by design, and the thickness of the wire is typically fixed by the IC manufacturing process. The delay of a 2 millimeter (mm) wire may vary by up to 2 orders of magnitude relative to the delay of an HVT inverter with a fan-out of four for a certain voltage range. The delay of a driver varies more relative to the delay of an HVT inverter as the fan-out of the driver increases. Wires have a larger impact on critical path performance as technology feature/transistor size shrinks, the IC die area to feature size ratio increases, and more logic cells are packed into an IC die. This is because more wires are used to connect logic cells as the level of integration increases. Furthermore, wire resistance and capacitance also increase with shrinking geometries. Therefore, a conventional delay synthesizer or a conventional ring oscillator that is composed of mostly logic cells does not accurately track the performance of a critical path that includes wires.

Figure 3:
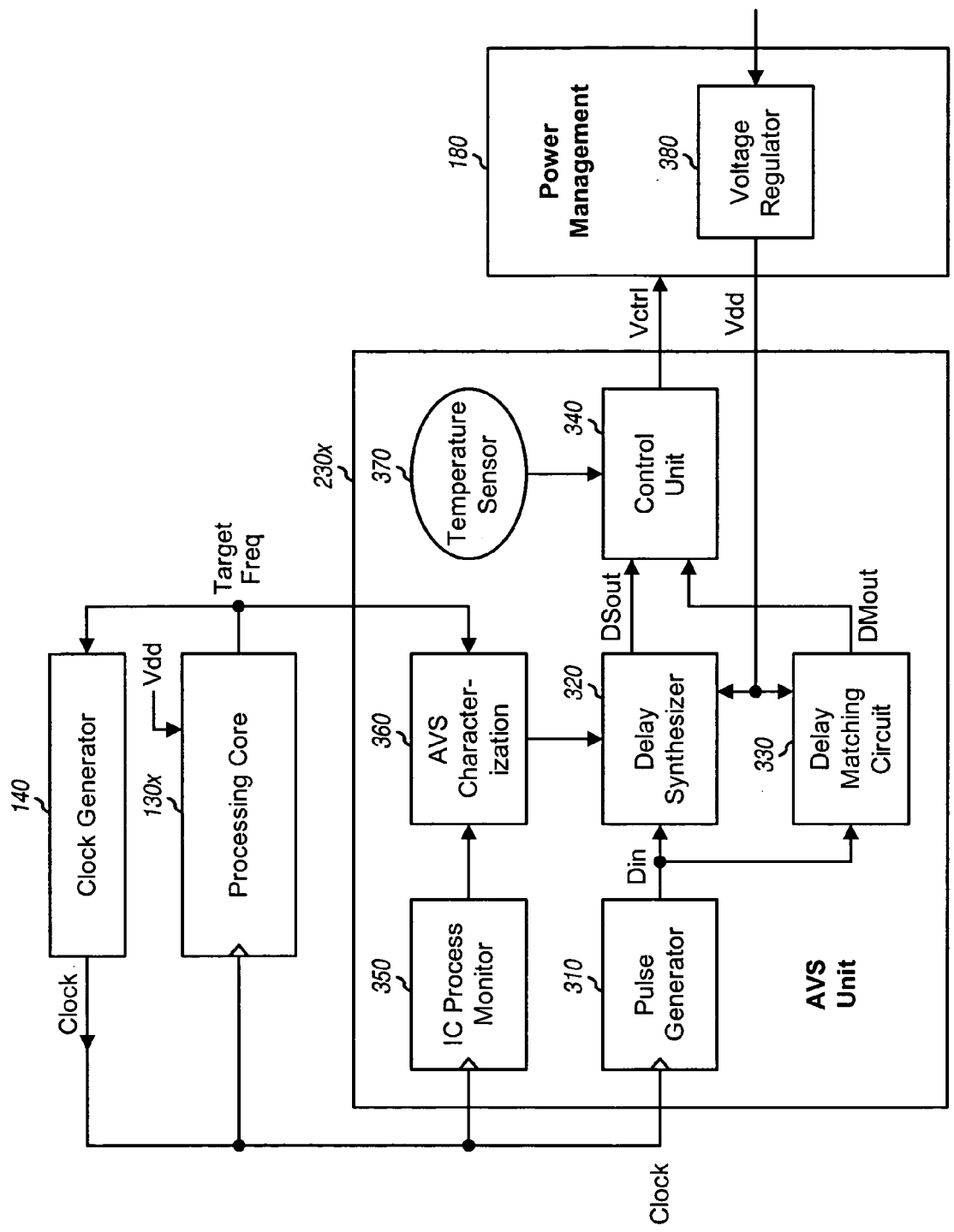
FIG. 3 shows an AVS unit for a processing core.

FIG. 3 shows an embodiment of an AVS unit 230x for an associated processing core 130x. AVS unit 230x may be used for each of AVS units 230a through 230d in FIG. 2, and processing core 130x may be any one of cores 130a through 130d.

Within AVS unit 230x, a pulse generator 310 receives a clock from clock generator 140. In an embodiment, which is not shown in FIG. 3, pulse generator 310 generates a first input signal (DSin) for a delay synthesizer 320 and a second input signal (DMin) for a delay matching circuit 330. The DSin and DMin signals may each include a pulse for each leading edge in the clock. The pulse on the DMin signal may be delayed by a fixed amount relative to the pulse on the DSin signal. In another embodiment, which is described below, pulse generator 310 generates a single input signal (Din) that is provided to both delay synthesizer 320 and delay matching circuit 330. The pulse on the Din signal propagates through delay synthesizer 320 and is received via a first input of a control unit 340. The pulse on the Din signal also propagates through delay matching circuit 330 and is received via a second input of control unit 340. Delay synthesizer 320 models the critical path for processing core 130x. Delay synthesizer 320 includes multiplexers that allow for flexible programming of the delay synthesizer. However, these multiplexers introduce additional delays that may be substantial relative to the total delay of the critical path being replicated. Delay matching circuit 330 accounts for the multiplexer delays within delay synthesizer 320.

Control unit 340 receives the pulses from delay synthesizer 320 and delay matching circuit 330 and measures the "pure" delay of the replicated critical path within delay synthesizer 320 based on the received pulses. Control unit 340 generates a voltage control (Vctrl) based on the measured critical path delay and possibly a temperature measurement from a temperature sensor 370. A voltage regulator 380 within power management unit 180 receives the voltage control from control unit 340, adjusts the regulated supply voltage (Vdd) based on the voltage control, and provides the regulated supply voltage to processing core 130x, delay synthesizer 320, and delay matching circuit 330.

An IC process monitor unit 350 determines the logic and wire delays for ASIC 120 and provides this information to an AVS characterization unit 360. Unit 360 also receives the target clock frequency for processing core 130x and provides Mux Sel signals (as shown in FIG. 3) that select an appropriate blend of circuit components for the replicated critical path within delay synthesizer 320. The various blocks within AVS unit 230x are described in detail below.

As shown in FIG. 3, AVS unit 230x is part of a closed-loop system that scales the supply voltage to achieve the desired performance for a critical path within processing core 130x. Delay synthesizer 320 may be programmed to obtain a replicated critical path having a blend of circuit components that matches the actual critical path in processing core 130x. Furthermore, delay synthesizer 320 may be programmed with different blends of circuit components to track changes in the actual critical path due to IC process and/or other variations. This enables close tracking of the actual critical path and results in high efficiency.

Figure 4A:
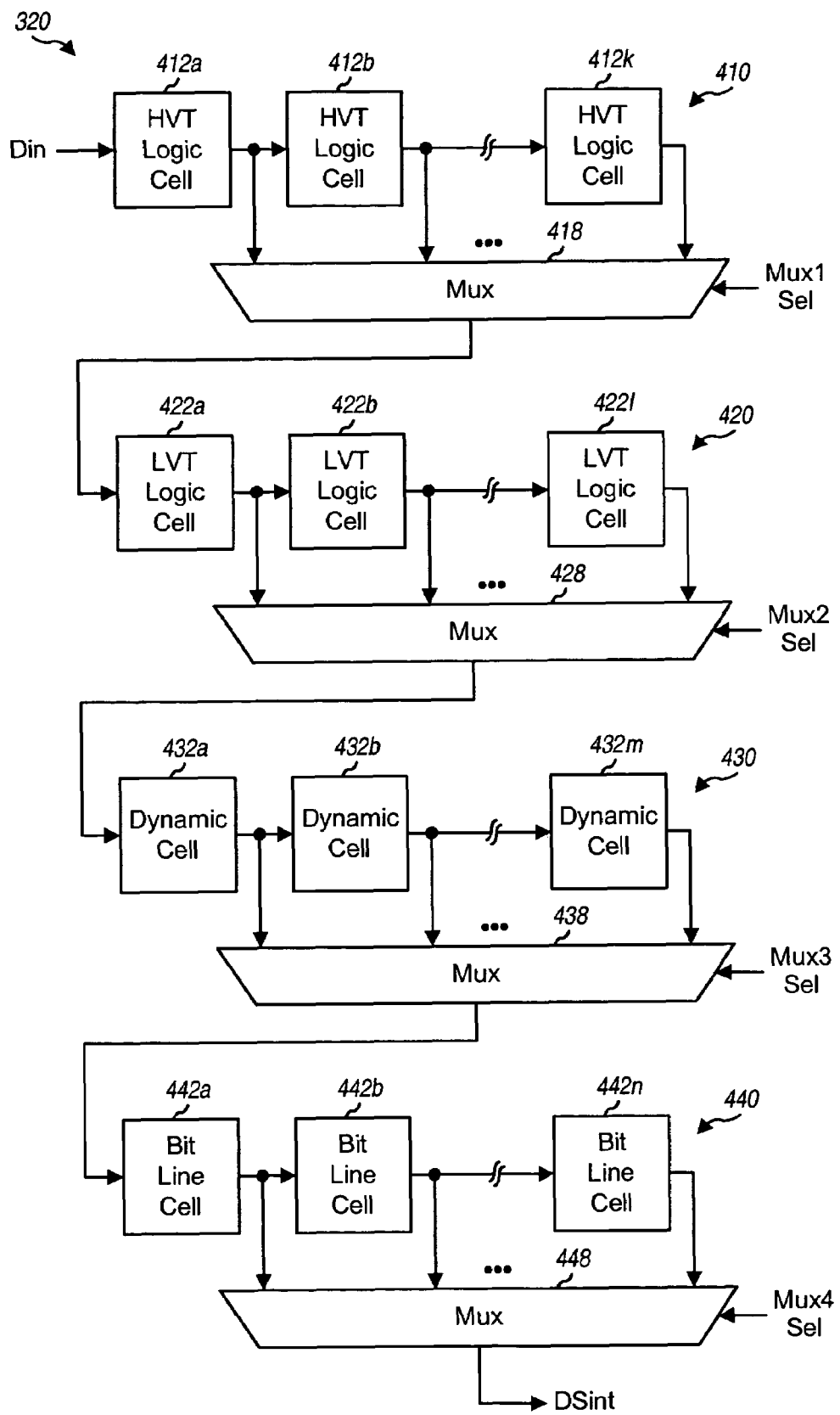
FIGS. 4A and 4B show a delay synthesizer within the AVS unit.
Figure 4B:
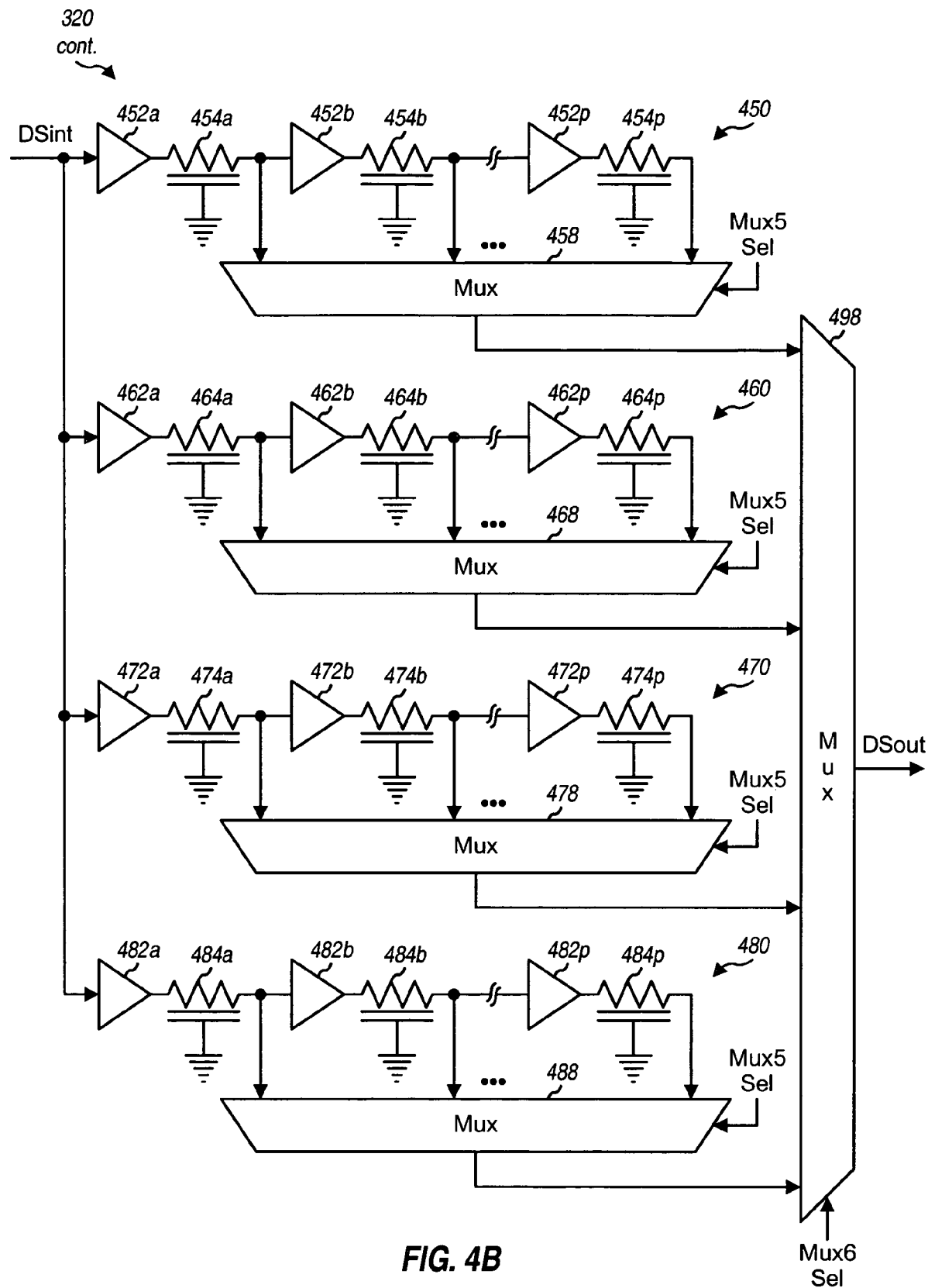

FIGS. 4A and 4B show an embodiment of delay synthesizer 320 within AVS unit 230x in FIG. 3. For this embodiment, delay synthesizer 320 includes multiple delay lines, with each delay line being composed of a different type of circuit component.

Within delay synthesizer 320, the Din signal from pulse generator 310 is provided to the input of a delay line 410 composed of K series-connected logic cells 412a through 412k (e.g., K=32). Each logic cell 412 may be implemented with inverters and/or logic gates formed with HVT devices. The outputs of the K logic cells 412a through 412k are provided to K inputs of a multiplexer (Mux) 418. Multiplexer 418 provides one of the K inputs as the multiplexer output based on a Mux1 Sel control.

The output of multiplexer 418 is provided to the input of a delay line 420 composed of L series-connected logic cells 422a through 422l (e.g., L=32). Each logic cell 422 may be implemented with inverters and/or logic gates formed with LVT devices. The outputs of the L logic cells 422a through 422l are provided to L inputs of a multiplexer 428. Multiplexer 428 provides one of the L inputs as the multiplexer output based on a Mux2 Sel control.

The output of multiplexer 428 is provided to the input of a delay line 430 composed of M series-connected dynamic cells 432a through 432m (e.g., M=32). Dynamic cells 432 are used to model diffusion capacitance. Diffusion capacitance is a result of the capacitive effect of the drain-to-well reverse-biased junction, which is different from the gate capacitance modeled by the delay lines 410 and 420. Each dynamic cell may be implemented as described below. The outputs of the M dynamic cells 432a through 432m are provided to M inputs of a multiplexer 438. Multiplexer 438 provides one of the M inputs as the multiplexer output based on a Mux3 Sel control.

The output of multiplexer 438 is provided to the input of a delay line 440 composed of N series-connected bit line cells 442a through 442n (e.g., N=4). Bit line cells 442 are used to track memory access delays and may be implemented as described below. The outputs of the N bit line cells 442a through 442n are provided to N inputs of a multiplexer 448. Multiplexer 448 provides one of the N inputs as the multiplexer output (DSint) based on a Mux4 Sel control.

Referring to FIG. 4B, the output of multiplexer 448 (DSint) is provided to the inputs of four delay lines 450, 460, 470 and 480. Each of delay lines 450, 460, 470 and 480 is composed of P series-connected wire cells (e.g., P=8). Each wire cell includes a driver and a wire. For delay line 450, drivers 452a through 452p are implemented with HVT devices and have fan-outs of FOa (e.g., FOa=8). For delay line 460, drivers 462a through 462p are implemented with HVT devices and have fan-outs of FOb (e.g., FOb=16). For delay line 470, drivers 472a through 472p are implemented with LVT devices and have fan-outs of FOa. For delay line 480, drivers 482a through 482p are implemented with LVT devices and have fan-outs of FOb. Each wire has series resistance and parasitic capacitance determined by the length, width and thickness of the wire. The wires for delay lines 450, 460, 470 and 480 may be designed to have the same or different lengths (e.g., the same length of 1 mm).

For delay line 450, drivers 452a through 452p drive wires 454a through 454p, respectively, which further couple to P inputs of a multiplexer 458. Multiplexer 458 provides one of the P inputs as the multiplexer output based on a Mux5 Sel control. For delay line 460, drivers 462a through 462p drive wires 464a through 464p, respectively, which further couple to P inputs of a multiplexer 468. Multiplexer 468 provides one of the P inputs as the multiplexer output based on the Mux5 control. For delay line 470, drivers 472a through 472p drive wires 474a through 474p, respectively, which further couple to P inputs of a multiplexer 478. Multiplexer 478 provides one of the P inputs as the multiplexer output based on the Mux5 Sel control. For delay line 480, drivers 482a through 482p drive wires 484a through 484p, respectively, which further couple to P inputs of a multiplexer 488. Multiplexer 488 provides one of the P inputs as the multiplexer output based on the Mux5 Sel control. A multiplexer 498 receives the outputs of multiplexers 458, 468, 478 and 488 and, based on a Mux6 Sel control, provides the output of one of these four multiplexers as the delay synthesizer output (DSout).

For the embodiment shown in FIGS. 4A and 4B, the Din signal passes through at least one cell in each delay line. In another embodiment, the input signal for each delay line may be provided to one input of the multiplexer for that delay line. For this embodiment, the Din signal can pass directly through the multiplexer and bypass all of the cells in the delay line.

For the delay synthesizer structure shown in FIGS. 4A and 4B, delay line 410 emulates logic delays for HVT devices, delay line 420 emulates logic delays for LVT devices, delay line 430 emulates diffusion delays, delay line 440 emulates memory access delays, delay line 450 emulates wire delays with HVT drivers having fan-outs of FOa, delay line 460 emulates wire delays with HVT drivers having fan-outs of FOb, delay line 470 emulates wire delays with LVT drivers having fan-outs of FOa, and delay line 480 emulates wire delays with LVT drivers having fan-outs of FOb.

The delay synthesizer structure shown in FIGS. 4A and 4B can flexibly replicate a critical path with a desired blend of circuit components. Each delay line is composed of multiple series-connected cells for a different type of circuit component. The multiplexer for each delay line can include a selectable number of cells for that delay line in the replicated critical path. The same delay synthesizer structure may be used in AVS units 230a through 230d for cores 130a through 130d, respectively. The replicated critical path for each core may be individually and flexibly formed by properly controlling the multiplexers in the delay synthesizer for that core. Furthermore, the replicated critical path may be easily varied to match the performance of the actual critical path in the associated core.

In general, a delay synthesizer structure may include any number of delay lines, and each delay line may emulate any type of circuit and may include any number of cells. Such a structure provides great flexibility in replicating a critical path. In another embodiment, a delay synthesizer structure may include multiple hypothesized critical paths, with each hypothesized critical path including a different blend of circuit components. One of the hypothesized critical paths may be selected as the replicated critical path.

FIG. 5A shows an embodiment of a logic cell 412x, which may be used for each of logic cells 412a through 412k and 422a through 422l in FIG. 4A. For this embodiment, logic cell 412x is composed of Q series-connected inverters 512a through 512q, where $Q \geq 1$. Q may be selected such that logic cell 412x can provide the desired amount of delay across IC process, temperature, and voltage variations. Each inverter 512 may be implemented with HVT or LVT devices. Logic cells 412a through 412k for delay line 410 in FIG. 4A may include the same or different numbers of inverters. Logic cells 422a through 422l for delay line 420 may also include the same or different numbers of inverters. Each logic cell may also be implemented with other logic gates (e.g., AND, NAND, OR, NOR, exclusive-OR, or some other logic gate) or any combination of logic gates.

FIG. 5B shows an embodiment of a dynamic cell 432x, which may be used for each of dynamic cells 432a through 432m in FIG. 4A. For this embodiment, dynamic cell 432x is composed of P-FETs 530 and 538, R parallel-coupled N-FETs 532a through 532r, an N-FET 534, and an inverter 536, where. P-FET 530 has its source coupled to the supply voltage, its gate forming the dynamic cell input, and its drain coupled to the drains of N-FETs 532a through 532r. The gate of N-FET 532a is coupled to the supply voltage, and the gates of N-FETs 532b through 532r are coupled to circuit ground. N-FET 534 has its source coupled to circuit ground, its gates coupled to the dynamic cell input, and its drain coupled to the sources of N-FETs 532a through 532r. P-FET 538 has its source coupled to the supply voltage, its gate coupled to the output of inverter 536, and its drain coupled to the drains of N-FETs 532a through 532r. P-FET 538 provides feedback to restore the charge leakage in N-FETs 532a through 532r when they are all turned off.

The Din signal propagates through dynamic cells 432a through 432m in delay line 430. When the Din signal at the input of dynamic cell 432x is at logic low, P-FET 530 is turned on and precharges node A to logic high, N-FET 534 is turned off, and the output of inverter 536 is at logic low. When the pulse appears on the Din signal, P-FET 530 is turned off, N-FET 534 is turned on and pulls node A to logic low via N-FET 532a, and the output of inverter 536 transitions to logic high. N-FET 532a is evaluated and N-FETs 532b through 532r are not evaluated. The delay through dynamic cells 432x is determined by the diffusion capacitance of N-FETs 532a through 532r.

FIG. 5C shows an embodiment of a bit line cell 442x, which may be used for each of bit line cells 442a through 442n in FIG. 4A. For this embodiment, bit line cell 442x includes a precharge circuit 540, a dummy column 542, S memory cells 544a through 544s, where $S \geq 1$, and a sense amplifier 546. Upon receiving a pulse on the Din signal at the bit line cell input, precharge circuit 540 precharges both the bit line (BL) and the complementary bit line (BLb) to logic high, and dummy column 542 generates an enable signal for sense amplifier 546. The Din pulse also selects memory cell 544a after a small delay, which is not shown in FIG. 5C for simplicity. Memory cell 544a stores a logic high ('1') and, when enabled, pulls the BLb line to logic low. Sense amplifier 546 senses the voltage difference between the BL and BLb lines and, after a short delay determined by the discharge rate of the BLb line, provides a logic high to one input of multiplexer 448 and to the input of the next bit line cell (if any). Bit line cell 442x is able to track memory access delays, e.g., for SRAM, cache, and other memories.

Figure 6:
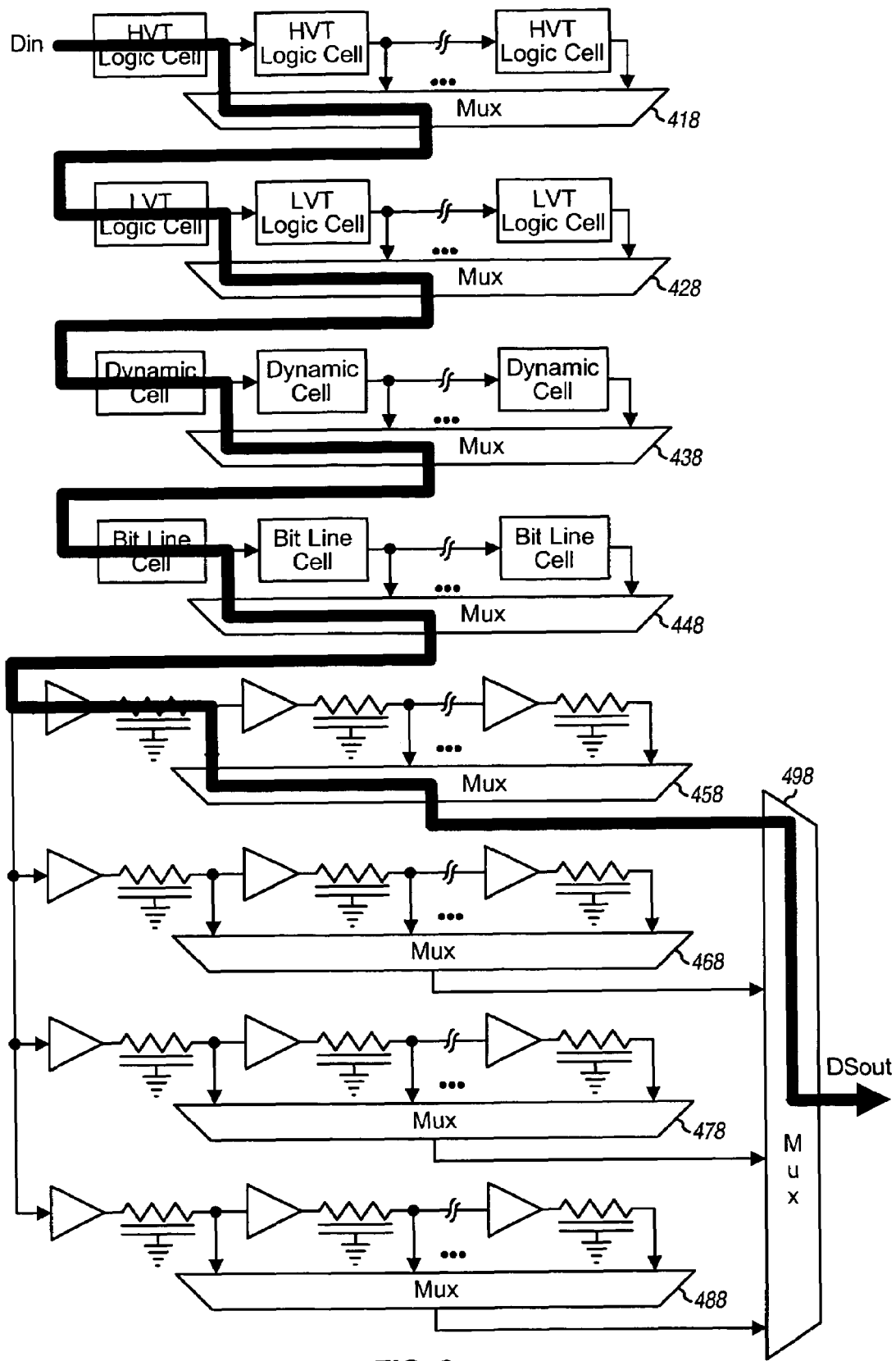
FIG. 6 shows a replicated critical path with a minimum number of cells.

FIG. 6 shows a replicated critical path composed of the minimum number of cells in each delay line for delay synthesizer 320 shown in FIGS. 4A and 4B. For this replicated critical path, the Din signal passes through six multiplexers 418, 428, 438, 448, 458 and 498. Each multiplexer typically includes multiple levels of logic gates that introduce additional delays. Hence, the total delay observed by the Din signal for the replicated critical path is composed of (1) the delays introduced by the cells used to emulate the actual critical path and (2) the delays introduced by the multiplexers used to form the replicated critical path. The multiplexer delays increase with both the number of multiplexers and the number of inputs for each multiplexer. The multiplexer delays may represent a fairly significant portion of the total delay for the replicated critical path, especially at high speed such as, e.g., 1 GHz and above.

The multiplexer delays may be handled in various manners. In an embodiment, the multiplexer delays are treated as a portion of the logic delays. The delays from other circuit types (e.g., wires, diffusion, and so on) should be sufficiently long to obtain the desired blend of delays (e.g., 20% logic delays and 80% wire delays). For this embodiment, the multiplexers may be implemented with the same device type as most of the logic within the associated core. For example, if the associated core is implemented with mostly LVT devices, then the multiplexers may also be implemented with LVT devices. The delays for other circuit types may be extended, if needed, to obtain the desired blend of delays.

In another embodiment, delay matching circuit 330 is used to estimate the multiplexer delays. The estimated multiplexer delays may then be subtracted from the total delay of delay synthesizer 320 to obtain the "pure" delay of the replicated critical path within the delay synthesizer.

Figure 7:
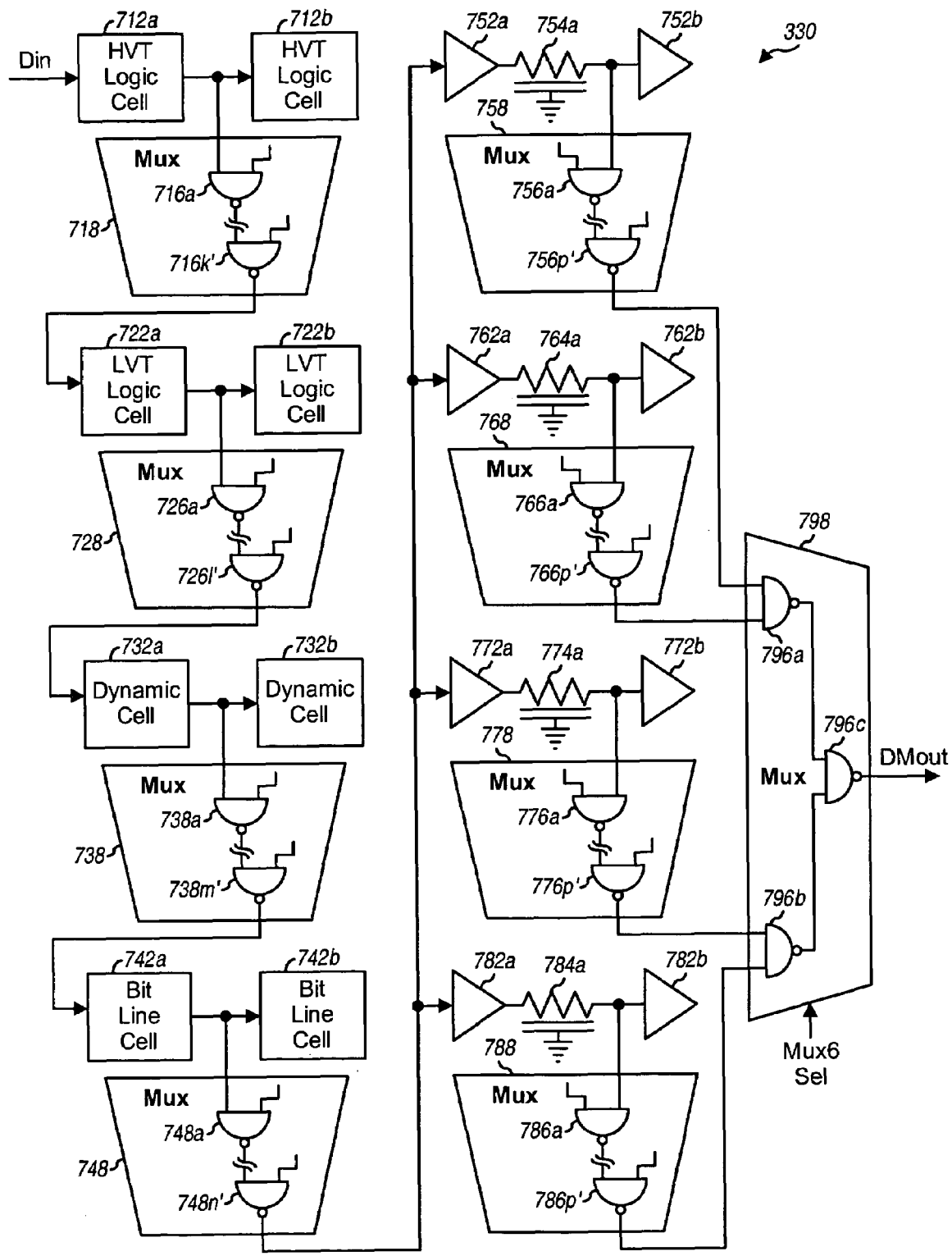
FIG. 7 shows a delay matching circuit within the AVS unit.

FIG. 7 shows an embodiment of delay matching circuit 330 within AVS unit 230x in FIG. 3. For this embodiment, delay matching circuit 330 includes the same number of delay lines and the same number of multiplexers as delay synthesizer 320.

Within delay matching circuit 330, the Din signal from pulse generator 310 is provided to the input of a delay line composed of two series-connected logic cells 712a and 712b. Logic cell 712b simulates the loading for logic cell 712a and may be included in delay matching circuit 330 as shown in FIG. 7 or may be omitted. The output of logic cell 712a is provided to an input of a partial multiplexer 718 that models the signal path between one input and the output of multiplexer 418. Multiplexer 718 includes K' series-connected NAND gates 716a through 716k', where K'≈2·log$_2$ (K) and K is the number of inputs for multiplexer 418.

The output of multiplexer 718 is provided to the input of a delay line composed of two series-connected logic cells 722a and 722b. A partial multiplexer 728 receives the output of logic cell 722a and provides its output to the input of a delay line composed of two series-connected dynamic cells 732a and 732b. A partial multiplexer 738 receives the output of dynamic cell 732a and provides its output to the input of a delay line composed of two series-connected bit line cells 742a and 742b. A partial multiplexer 748 receives the output of bit line cell 742a and provides its output to the inputs of four wire delay lines. The first wire delay line includes a full wire cell composed of a driver 752a and a wire 754a and a partial wire cell composed of a driver 752b. The second wire delay line includes a full wire cell composed of a driver 762a and a wire 764a and a partial wire cell composed of a driver 762b. The third wire delay line includes a full wire cell composed of a driver 772a and a wire 774a and a partial wire cell composed of a driver 772b. The fourth wire delay line includes a full wire cell composed of a driver 782a and a wire 784a and a partial wire cell composed of a driver 782b. The other ends of wires 754a, 764a, 774a and 784a couple to the inputs of partial multiplexers 758, 768, 778 and 788, respectively, which provide their outputs to the four inputs of a multiplexer 798. Multiplexer 798 also receives the Mux6 Sel control and provides the output of one of multiplexers 758, 768, 778 and 788 as the delay matching circuit output (DMout).

Logic cells 712a, 712b, 722a and 722b may be implemented in the same manner as logic cells 412a, 412b, 422a and 422b, respectively, within delay synthesizer 320 in FIG. 4A. Dynamic cells 732a and 732b may be implemented in the same manner as dynamic cells 432a and 432b, respectively. Bit line cells 742a and 742b may be implemented in the same manner as bit line cells 442a and 442b, respectively. Drivers 752a, 762a, 772a and 782a may be implemented in the same manner as drivers 452a, 462a, 472a and 482a, respectively, and wires 754a, 764a, 774a and 784a may be implemented in the same manner as wires 454a, 464a, 474a and 484a, respectively. Partial multiplexers 718, 728, 738, 748, 758, 768, 778 and 788 model the signal path between one input and the output of multiplexers 418, 428, 438, 448, 458, 468, 478 and 488, respectively. Multiplexer 798 may be implemented in the same manner as multiplexer 498.

Delay matching network 330 may be used to absorb the delays of the multiplexers within delay synthesizer 320. This allows AVS unit 230x to accurately model the critical path at high frequency.

Figure 8:
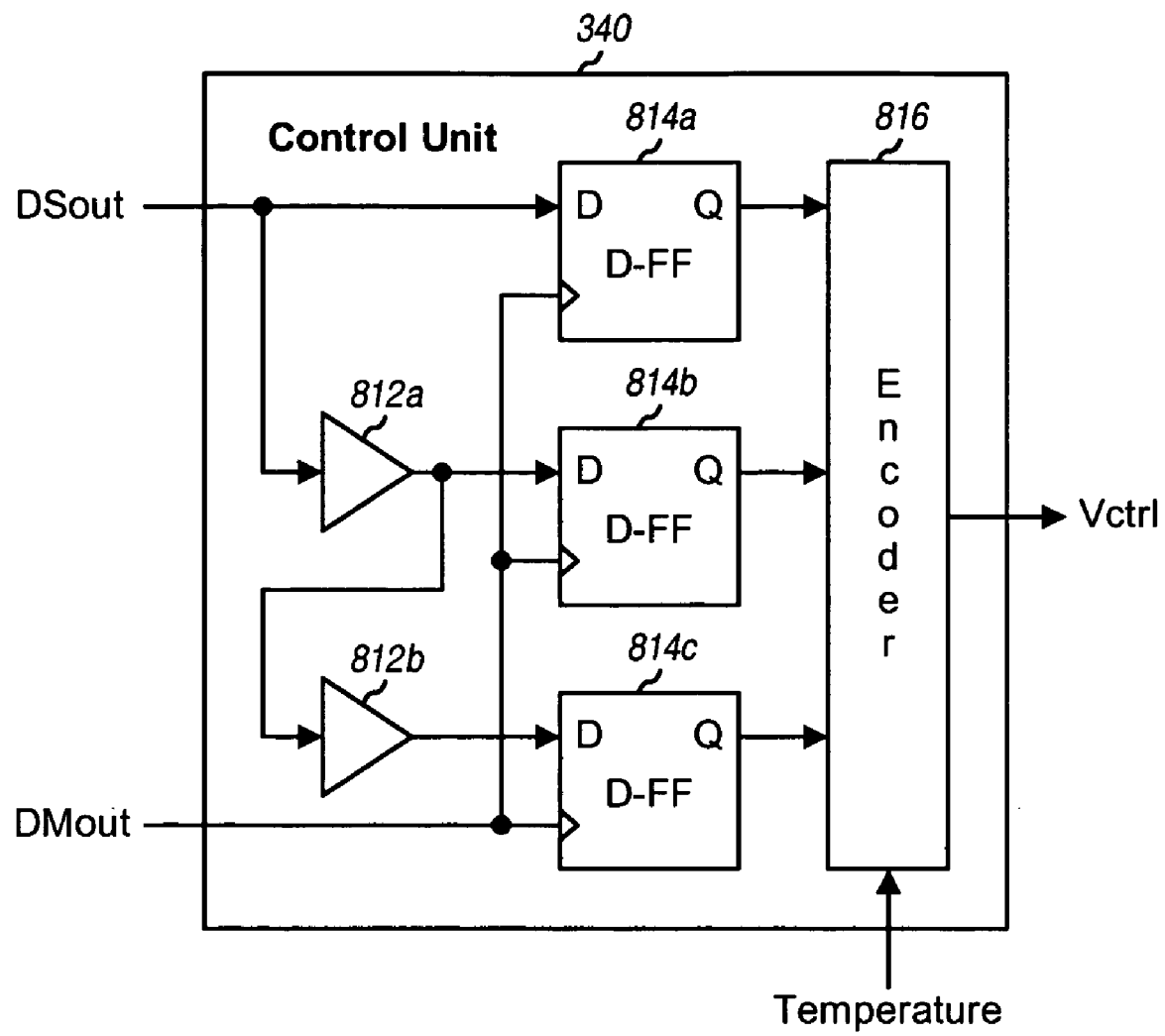
FIG. 8 shows a control unit within the AVS unit.

FIG. 8 shows an embodiment of control unit 340 within AVS unit 230x in FIG. 3. For this embodiment, the DSout signal from delay synthesizer 320 is provided to a data (D) input of a D flip-flop 814a and to the input of a delay cell 812a. The output of delay cell 812a couples to the data input of a D flip-flop 814b and to the input of a delay cell 812b. The output of delay cell 812b couples to the data input of a D flip-flop 814c. The DMout signal from delay matching circuit 330 is provided to the clock inputs of D flip-flops 814a, 814b and 814c. Each D flip-flop 814 latches its data input based on the DMout signal and provides it output (Q) to an encoder 816. Encoder 816 generates the voltage control Vctrl for power management unit 180 based on the outputs of flip-flops 814a, 814b and 814c and possibly a temperature measurement from temperature sensor 370.

Each of delay cells 812a and 812b may be designed to provide a predetermined amount of delay, e.g., 5% of a clock period at the highest clock frequency. Each flip-flop 814 provides a logic high if the pulse on its data input arrives earlier than the pulse on its clock input and provides a logic low otherwise. Flip-flop 814a provides a logic high if the pulse on the DSout signal arrives before the pulse on the DMout signal. Flip-flop 814b provides a logic high if the delayed pulse from delay cell 812a arrives before the pulse on the DMout signal. Flip-flop 814c provides a logic high if the delayed pulse from delay cell 812b arrives before the pulse on the DMout signal. If the supply voltage is too low, then the total delay of the replicated critical path is long and all three flip-flops may provide logic lows. Encoder 816 then generates the voltage control such that the supply voltage is increased. Conversely, if the supply voltage is too high, then the total delay of the replicated critical path is smaller than the target frequency and all three flip-flops may provide logic highs. Encoder 816 then generates the voltage control such that the supply voltage is decreased.

Control unit 340 generates the voltage control to adjust the supply voltage based on the measured critical path delay. The critical path delay may be measured with three flip-flops as shown in FIG. 8 or more than three flip-flops to achieve greater delay resolution. The voltage control may be a 2-bit control that indicates whether to maintain the current supply voltage or to increase or decrease the supply voltage by a predetermined amount. The voltage control may also be a multi-bit control that indicates the amount of voltage to increase or decrease. Control unit 340 may also disregard the outputs of flip-flops 814a, 814b and 814c and provide predetermined voltage controls if the temperature measurement is outside of a nominal temperature range. Control unit 340 may also use the temperature measurement in other manners to generate the voltage control.

Temperature may vary across an IC die due to different compositions of active and passive devices across the IC die. Temperature gradient across IC die may be accounted for by placing multiple delay synthesizers throughout the IC die. For example, multiple (e.g., four) delay synthesizers may be placed at different corners of a processing core. The AVS unit for that processing core may receive the outputs from all delay synthesizers and may adjust the supply voltage based on the slowest delay synthesizer.

The delays for different circuit components (e.g., logic and wire) are typically dependent on IC process variations. For example, a fast IC process corner results in faster logic and hence less logic delays, whereas a slow IC process corner results in slower logic and hence more logic delays. The parasitic resistance and capacitance of wires may also vary due to IC process variations, which would then result in different wire delays. The delays of logic cells and wires for ASIC 120 may be characterized and used for voltage scaling.

Figure 9:
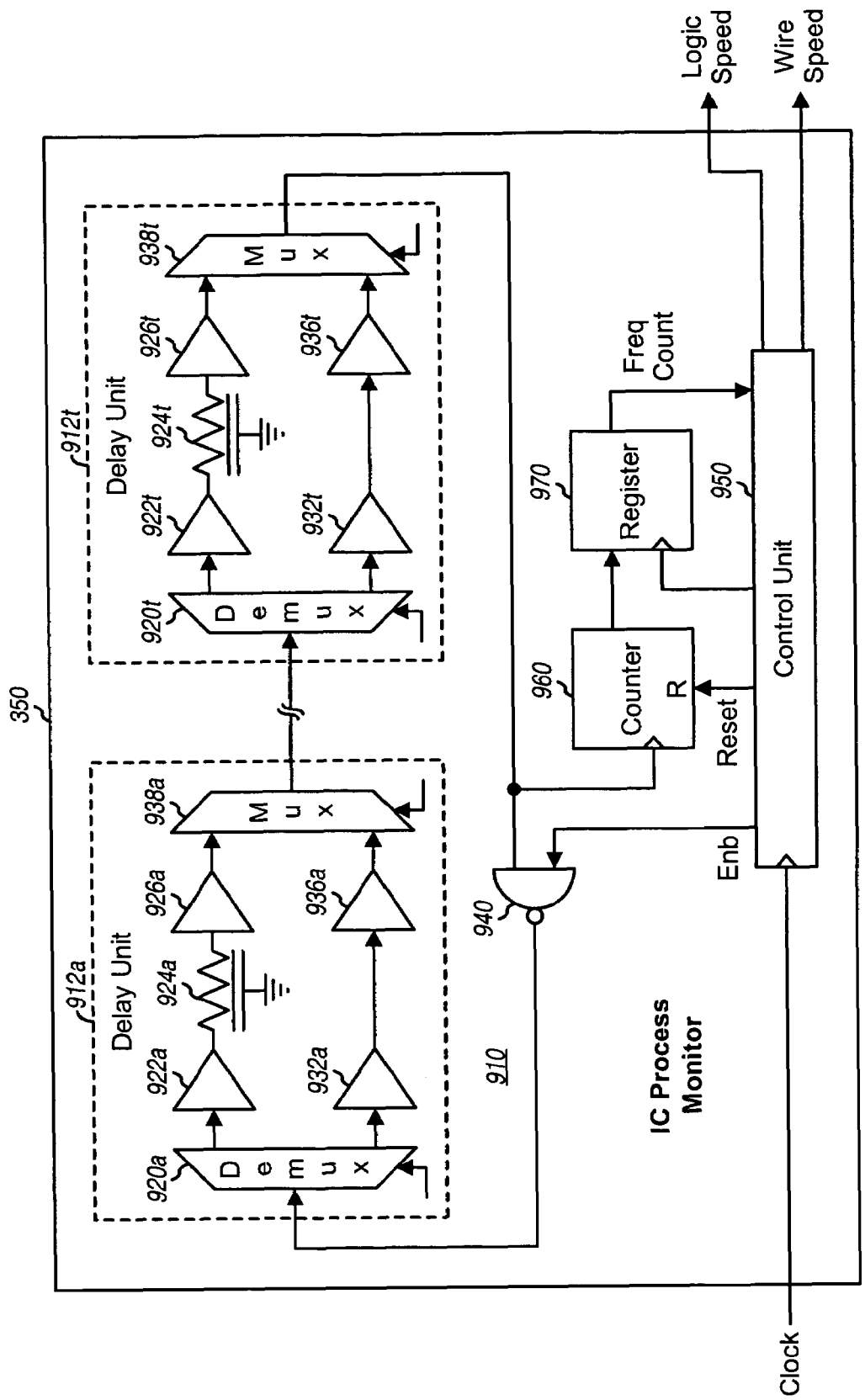
FIG. 9 shows an IC process monitor unit within the AVS unit.

FIG. 9 shows an embodiment of IC process monitor unit 350 within AVS unit 230x in FIG. 3. For this embodiment, a ring oscillator 910 is formed with T delay units 912a through 912t and a NAND gate 940, where T≧1. Within each delay unit 912, a demultiplexer (Demux) 920 has its input coupled to the output of either NAND gate 940 or a preceding delay unit and its two outputs coupled to the inputs of buffers 922 and 932. Buffer 922 drives a wire 924 that further couples to the input of a buffer 926. Buffer 932 drives a buffer 936. A multiplexer 938 receives the outputs of buffers 926 and 936 at its two inputs and provides one of the two inputs as the delay unit output. For each delay unit 912, buffers 922 and 926 and wire 924 form a first signal path composed of logic and wire, and buffers 932 and 936 form a second signal path composed of only logic. Buffers 932 and 936 in the second signal path may be implemented in the same manner as buffers 922 and 926 in the first signal path, so that wire 924 is the only difference between the two signal paths. Either the first or second signal path may be selected by providing the proper Mux/Demux control to demultiplexer 920 and multiplexer 938.

NAND gate 940 receives the output of the last delay unit 912t on one input and an enable (Enb) signal from a control unit 950 on the other input. The output of NAND gate 940 is provided to the input of the first delay unit 912a. Ring oscillator 910 is operational when the enable signal is at logic high and provides an oscillator signal having a frequency that is determined by (1) the selected signal path within delay units 912a through 912t and (2) the characteristics of the circuit components in the selected signal path, which are dependent on IC process. A counter 960 receives the oscillator signal and counts the number of oscillator cycles based on a first control from control unit 950. A register 970 latches the output of counter 960 based on a second control from control unit 950 and provides a frequency count. Control unit 950 receives the clock and generates the controls for delay units 912a through 912t, NAND gate 940, counter 960 and register 970. Control unit 950 also receives the frequency count from register 970 and provides a logic speed output and a wire speed output for AVS characterization unit 360.

The logic speed and the wire speed may be determined as follows. Ring oscillator 910 is first configured to operate with the second signal path in all delay units 912a through 912t by setting the Mux/Demux control to logic high. Counter 960 then samples the frequency of ring oscillator 910 by counting the number of oscillator cycles in a first time window. Register 970 latches the counter output at the end of the first time window and provides a first frequency count that is indicative of the logic speed. Ring oscillator 910 is next configured to operate with the first signal path in all delay units 912a through 912t by setting the Mux/Demux control to logic low. Counter 960 then samples the frequency of ring oscillator 910 in a second time window of the same duration as the first time window. Register 970 latches the counter output at the end of the second time window and provides a second frequency count that is indicative of the logic and wire speed. The difference between the first and second frequency counts is indicative of the wire speed.

The logic speed and the wire speed provided by control unit 940 are dependent on IC process. In an embodiment, IC process monitor unit 350 is operated once (e.g., during calibration of wireless device 100) to obtain the logic speed and the wire speed at a predetermined supply voltage. In other embodiments, IC process monitor unit 350 may be operated as needed and possibly for different supply voltages and/or temperatures to obtain the logic speed and the wire speed for different operating conditions. The logic speed and the wire speed are used to form the replicated critical path, as described below.

Figure 10A:
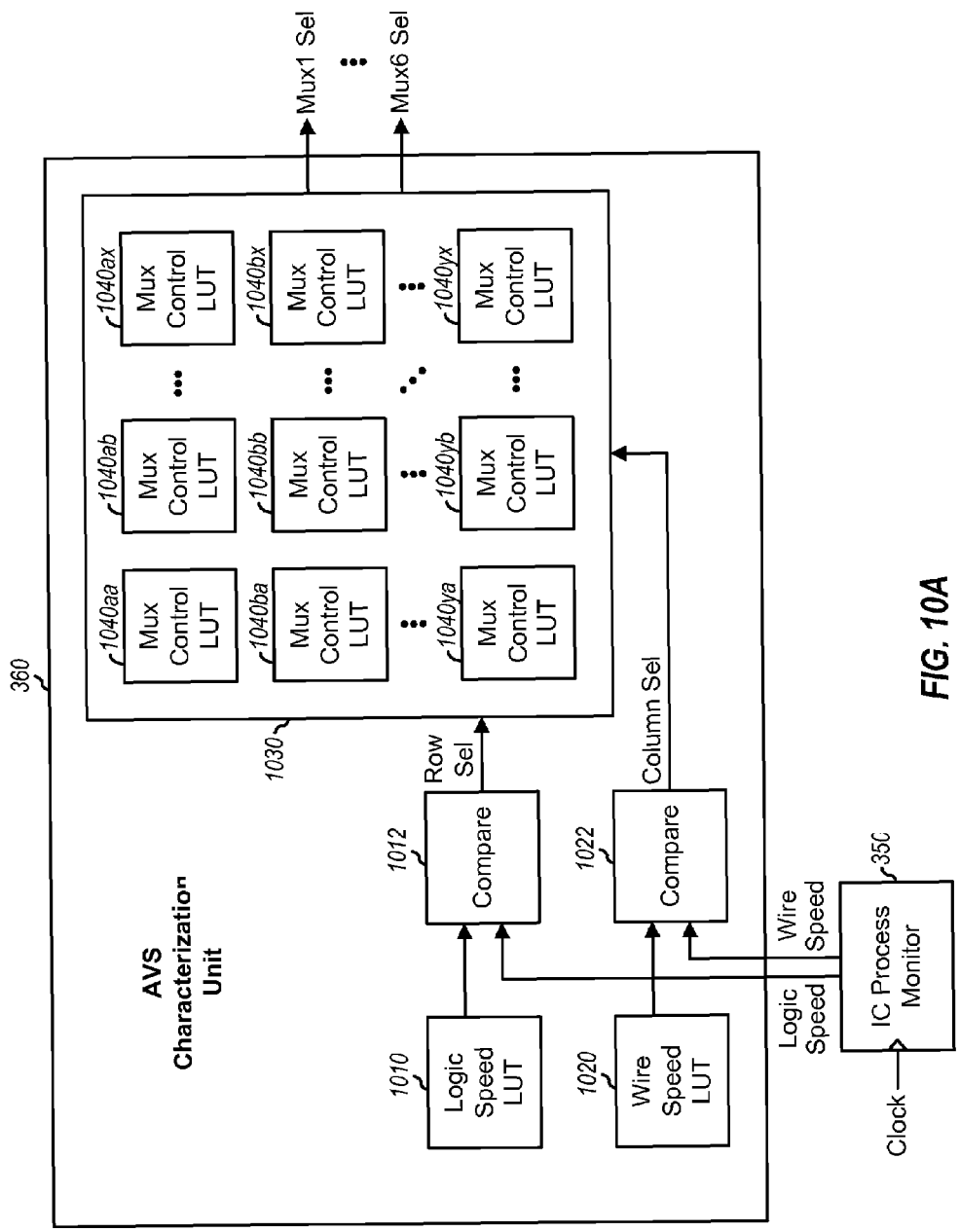
FIGS. 10A and 10B show an AVS characterization unit within the AVS unit.

FIG. 10A shows an embodiment of AVS characterization unit 360 within AVS unit 230x in FIG. 3. For this embodiment, a look-up table (LUT) 1010 stores a set of nominal logic speed values for different logic characterizations, and a look-up table 1020 stores a set of nominal wire speed values for different wire characterizations. In general, the nominal logic speed and the nominal wire speed may be stored for any number of logic and wire characterizations, respectively, which are typically dependent on IC process variations (e.g., fast, nominal, slow, and so on). The values stored in look-up tables 1010 and 1020 may be determined by computer simulation, empirical measurements, and so on. By characterizing logic speed and wire speed separately, only two look-up tables 1010 and 1020 may be used to store nominal logic speed and nominal wire speed for different characterizations.

A compare unit 1012 receives the measured logic speed from IC process monitor unit 350 and compares the measured logic speed against the values stored in look-up table 1010 to determine the logic characterization for processing core 130x. Similarly, a compare unit 1022 receives the measured wire speed from IC process monitor unit 350 and compares the measured wire speed against the values stored in look-up table 1020 to determine the wire characterization for processing core 130x. For example, look-up table 1010 may store x and y values for three logic characterizations of fast, nominal, and slow, where x>y. Compare unit 1012 may compare the measured logic speed s against the stored values and may indicate a fast process if s≧x, a nominal process if x>s ≧y, and a slow process if s<y.

A memory 1030 stores a matrix of Mux control look-up tables 1040aa through 1040yx. Each row of the matrix is for a different logic characterization stored in look-up table 1010.

Each column of the matrix is for a different wire characterization stored in look-up table 1020. Each Mux control look-up table 1040 stores the values for the Mux Sel controls for multiplexers 418, 428, 438, 448, 458, 468, 478, 488 and 498 within delay synthesizer 320 in FIGS. 4A and 4B. These Mux Sel controls define a replicated critical path that should closely resemble the actual critical path for the characterizations applicable to processing core 130x. The values stored in each Mux control look-up table 1040 may be determined by computer simulation, empirical measurements, and so on. The Mux control look-up table at the row indicated by compare unit 1012 and the column indicated by compare unit 1022 is selected for use.

Figures 10B, 11:
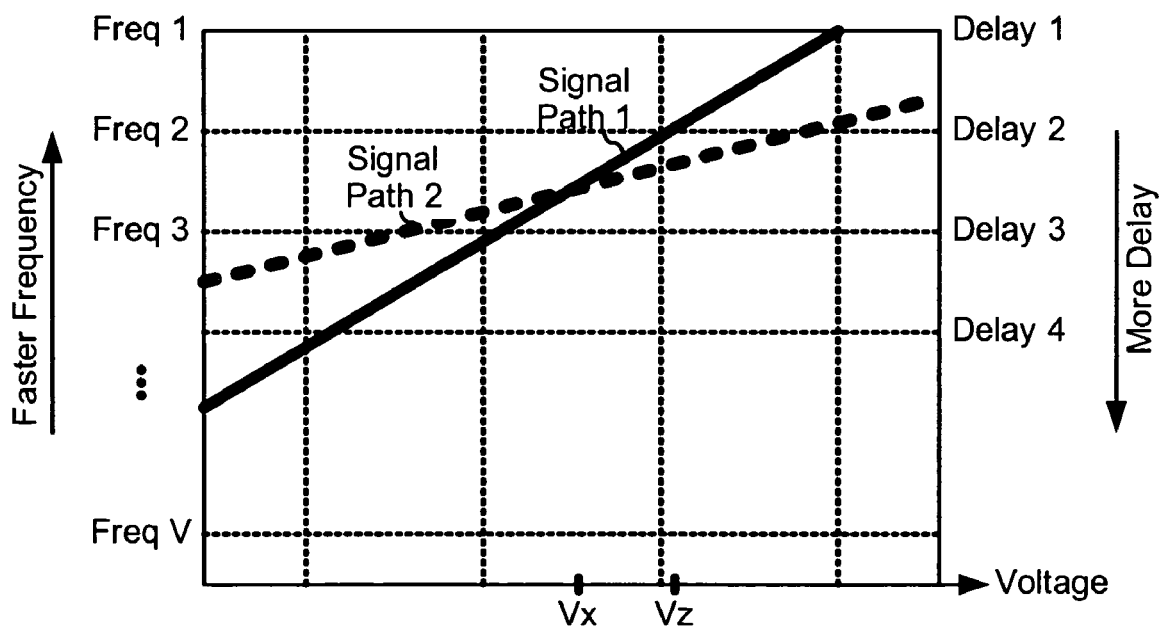
FIG. 11 shows plots of the performance of two signal paths.

FIG. 10B shows an embodiment of one Mux control look-up table 1040ij within memory 1030. Look-up table 1040ij stores V sets of Mux Sel control values for multiplexer 418, 428, 438, 448, 458, 468, 478, 488 and 498 within delay synthesizer 320 for V different clock frequencies. The set of Mux Sel control values corresponding to the target frequency for processing core 130x is retrieved from look-up table 1040ij and provided to the multiplexers within delay synthesizer 320.

FIG. 11 shows plots of the performance of two exemplary signal paths within a processing core. The delay of each signal path is plotted versus supply voltage. For the example shown in FIG. 11, signal path 1 has longer delay and is the critical path below Vx volts, and signal path 2 has longer delay and is the critical path above Vx volts. As shown in FIG. 11, different signal paths can become the critical path in different conditions. This is because each signal path may be composed of a different blend of circuit components that may vary in different manners across voltage, temperature, and IC process variations. The delay of the critical path determines the highest clock frequency for that path and is thus inversely related to frequency. For a given target frequency, the critical path for that frequency may be replicated, and AVS unit 230 adjusts the supply voltage such that the desired performance can be achieved for the target frequency. For example, if the target frequency is Freq 2, then signal path 2 may be selected, and the AVS unit adjusts the supply voltage to Vz volts.

Figure 12:
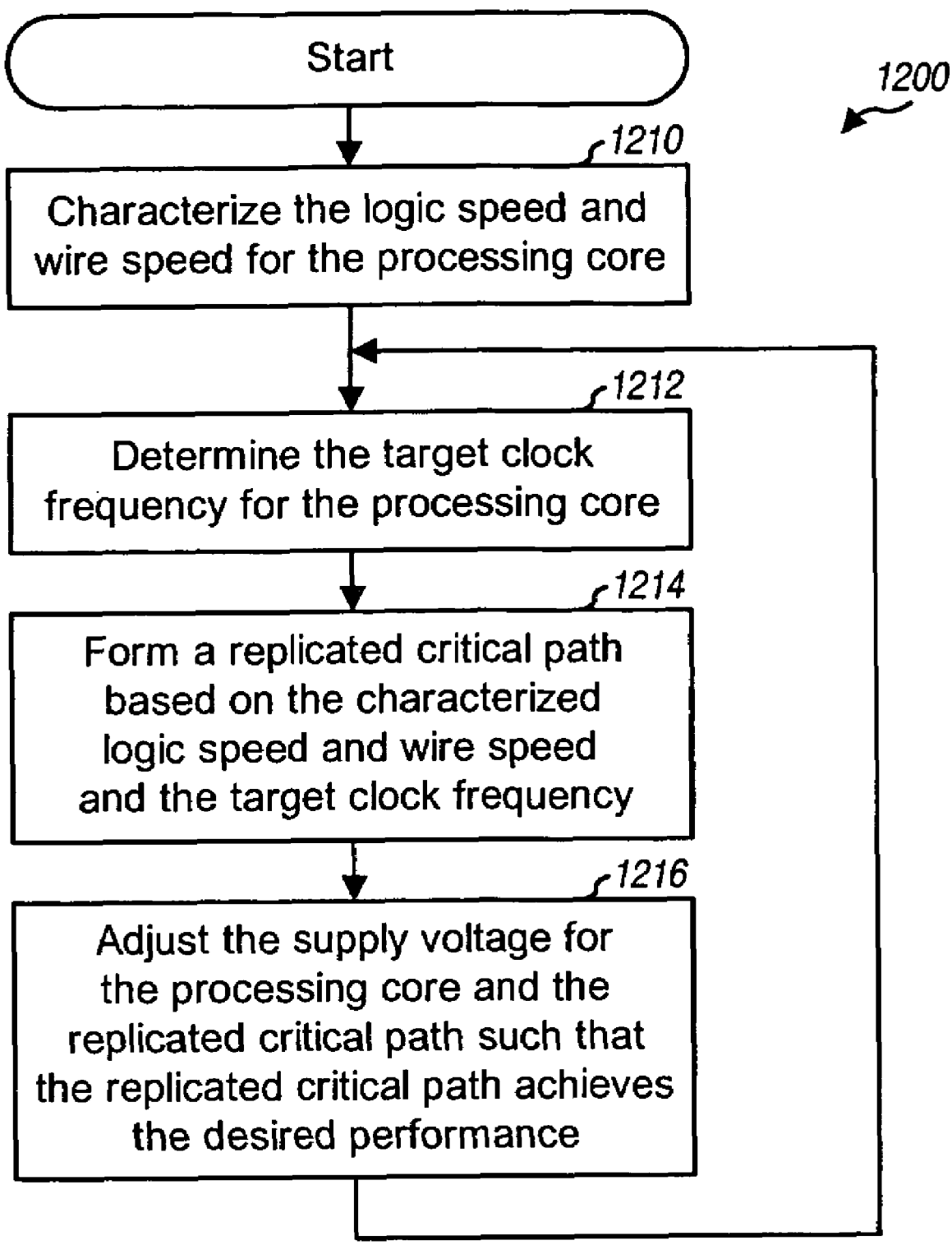
FIG. 12 shows a process for performing adaptive voltage scaling.

FIG. 12 shows an embodiment of a process 1200 for performing adaptive voltage scaling for a processing core. The logic speed and the wire speed for the processing core are characterized (block 1210). This characterization may be performed once, e.g., during calibration of a wireless device and as described above for FIG. 9. The target clock frequency for the processing core is determined (block 1212). The target clock frequency may be dynamically varied based on, e.g., the computational requirements for the processing core. A replicated critical path is formed based on the characterized logic speed and wire speed and the target clock frequency, e.g., as described above for FIGS. 10A and 10B (block 1214). The replicated critical path may include different types of circuit components such as HVT logic, LVT logic, dynamic cells, bit line cells, wires, drivers with different threshold voltages and/or fan-outs, and so on. The supply voltage for the processing core and the replicated critical path is then adjusted such that both achieve the desired performance (block 1216). Process 1200 may then return to block 1212 to periodically determine the target clock frequency.

The replicated critical path described herein uses a blend of circuit components to emulate the actual critical path. This replicated critical path is generally more accurate than a conventional replicated critical path that is implemented with a ring oscillator or a delay line composed of all logic or mostly logic gates. Furthermore, the replicated critical path described herein may be easily varied by programming the multiplexers to flexibly model different critical paths for different conditions.

The adaptive voltage scaling techniques described herein have the following desirable characteristics:
 Seamless programming of the delay lines to track changing critical path (FIGS. 4A and 4B).
 On-chip logic and wire binning using IC process monitor unit 350 to enable high efficiency tracking (FIG. 9).
 Temperature gradient tracking by placing multiple AVS units in different spots.
 Multi-threshold logic delay lines (FIG. 4A).
 Multi-threshold, multiple fan-out drivers for the wire delay lines (FIG. 4B).
 Diffusion dominated path tracking using dynamic cells (FIGS. 4A and 5B).
 Memory access delay tracking using bit line cells (FIGS. 4A and 5C).
 Considering multiplexer delays as a portion of the total logic delay and extending other types of delay (e.g., for wire and diffusion) to accommodate for the multiplexer delays.
 Delay matching circuit for absorbing the multiplexer delays to enable high-speed operation.

The adaptive voltage scaling techniques described herein may be implemented by various means. For example, these techniques may be implemented in hardware, firmware, software, or a combination thereof. For a hardware implementation, the adaptive voltage scaling may be implemented within an ASIC, a DSP, a processor, a controller, a micro-controller, a microprocessor, an electronic device, other electronic unit designed to perform the functions described herein, or a combination thereof.

Certain portions of the adaptive voltage scaling may be implemented with software modules (e.g., procedures, functions, and so on) that perform the functions described herein. The software codes may be stored in a memory (e.g., memory 150, 190 or 192 in FIG. 1) and executed by a processor (e.g., processor core 130c or 130d). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An integrated circuit comprising:
 a delay synthesizer configured to emulate a signal path in a processing core and comprising a first set of logic cells formed by transistor devices with a first threshold voltage and a second set of logic cells formed by transistor devices with a second threshold voltage; and
 a control unit coupled to the delay synthesizer and configured to provide a control based on an output of the delay synthesizer.

2. The integrated circuit of claim 1, wherein the control unit is configured to provide the control to adjust a supply voltage for the processing core.

3. The integrated circuit of claim 1, wherein the delay synthesizer comprises a selectable number of logic cells for each of the first and second threshold voltages.

4. The integrated circuit of claim 1, wherein the first and second threshold voltages correspond to a high threshold voltage (HVT) and a low threshold voltage (LVT), respectively.

5. The integrated circuit of claim 4, wherein the delay synthesizer comprises a selectable number of logic cells formed by HVT transistor devices and a selectable number of logic cells formed by LVT transistor devices.

6. The integrated circuit of claim 1, wherein the first and second sets of logic cells comprise inverters formed by the transistor devices with the first and second threshold voltages.

7. The integrated circuit of claim 1, wherein the first and second sets of logic cells comprise drivers formed by the transistor devices with the first and second threshold voltages.

8. An apparatus comprising:
  a delay synthesizer configured to emulate a signal path in a processing core and comprising a first set of logic cells formed by transistor devices with a first threshold voltage and a second set of logic cells formed by transistor devices with a second threshold voltage; and
  a control unit coupled to the delay synthesizer and configured to provide a control based on an output of the delay synthesizer.

9. The apparatus of claim 8, wherein the control unit is configured to provide the control to adjust a supply voltage for the processing core.

10. The apparatus of claim 8, wherein the delay synthesizer comprises a selectable number of logic cells for each of the first and second threshold voltages.

11. The apparatus of claim 8, wherein the first and second threshold voltages correspond to a high threshold voltage (HVT) and a low threshold voltage (LVT), respectively.

12. The apparatus of claim 11, wherein the delay synthesizer comprises a selectable number of logic cells formed by HVT transistor devices and a selectable number of logic cells formed by LVT transistor devices.

13. The apparatus of claim 8, wherein the first and second sets of logic cells comprise inverters formed by the transistor devices with the first and second threshold voltages.

14. The apparatus of claim 8, wherein the first and second sets of logic cells comprise drivers formed by the transistor devices with the first and second threshold voltages.

15. A method comprising:
  estimating delay of a signal path in a processing core with a delay synthesizer comprising a first set of logic cells formed by transistor devices with a first threshold voltage and a second set of logic cells formed by transistor devices with a second threshold voltage; and
  generating a control based on the estimated delay of the signal path in the processing core.

16. The method of claim 15, further comprising:
  adjusting a supply voltage for the processing core based on the control.

17. The method of claim 15, further comprising:
  selecting a first number of logic cells in the first set and a second number of logic cells in the second set to emulate the signal path in the processing core.

18. The method of claim 15, further comprising:
  determining a target clock frequency for the processing core; and
  selecting a first number of logic cells in the first set and a second number of logic cells in the second set based on the target clock frequency.

19. An apparatus comprising:
  means for estimating delay of a signal path in a processing core with a delay synthesizer comprising a first set of logic cells formed by transistor devices with a first threshold voltage and a second set of logic cells formed by transistor devices with a second threshold voltage; and
  means for generating a control based on the estimated delay of the signal path in the processing core.

20. The apparatus of claim 19, further comprising:
  means for adjusting a supply voltage for the processing core based on the control.

21. The apparatus of claim 19, further comprising:
  means for selecting a first number of logic cells in the first set and a second number of logic cells in the second set to emulate the signal path in the processing core.

22. The apparatus of claim 19, further comprising:
  means for determining a target clock frequency for the processing core; and
  means for selecting a first number of logic cells in the first set and a second number of logic cells in the second set based on the target clock frequency.

* * * * *